(12) United States Patent  (10) Patent No.: US 8,734,034 B2
Morovic et al.  (45) Date of Patent: May 27, 2014

(54) SYSTEM AND METHOD FOR PRE-PRINT INK USE ESTIMATION

(75) Inventors: Peter Morovic, Barcelona (ES); Jordi Vilar, Barcelona (ES); Jan Morovic, Colchester (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 180 days.

(21) Appl. No.: 13/276,863

(22) Filed: Oct. 19, 2011

(65) Prior Publication Data

US 2013/0101328 A1 Apr. 25, 2013

(51) Int. Cl.
*B41J 11/44* (2006.01)
(52) U.S. Cl.
USPC .............................................. 400/76; 400/62
(58) Field of Classification Search
CPC .................................................. H04N 1/00005
USPC ........................................................... 400/76
See application file for complete search history.

(56) References Cited

U.S. PATENT DOCUMENTS

| | | | |
|---|---|---|---|
| 5,357,448 A * | 10/1994 | Stanford | 382/112 |
| 6,312,073 B1 | 11/2001 | Inora et al. | |
| 6,827,415 B2 * | 12/2004 | Otokita et al. | 347/14 |
| 6,871,926 B2 * | 3/2005 | Adkins et al. | 347/7 |
| 7,443,102 B2 * | 10/2008 | Yin et al. | 315/193 |
| 7,766,438 B2 * | 8/2010 | Ehlert | 347/7 |
| 7,952,757 B2 * | 5/2011 | Kaneko et al. | 358/1.9 |
| 8,194,283 B2 * | 6/2012 | Honeck et al. | 358/1.9 |
| 8,559,081 B2 * | 10/2013 | Crean | 358/518 |
| 2003/0043401 A1 | 3/2003 | Abel et al. | |
| 2005/0083346 A1 * | 4/2005 | Takahashi et al. | 345/600 |
| 2006/0146365 A1 | 7/2006 | Sugita | |
| 2006/0274096 A1 * | 12/2006 | Kanda et al. | 347/14 |
| 2008/0111842 A1 | 5/2008 | Hall et al. | |
| 2009/0103122 A1 * | 4/2009 | Horita et al. | 358/1.9 |
| 2011/0007359 A1 | 1/2011 | Yamakawa et al. | |
| 2011/0134178 A1 * | 6/2011 | Chiwata | 347/14 |

* cited by examiner

*Primary Examiner* — Anthony Nguyen

(57) ABSTRACT

An image representation of an image and printing specifications describing how the image is to be printed may be accepted at a device. A predicted ink drop count may be calculated by a processor in the device using the image representation and a printer imaging step, the printer imaging step to convert image data into printer data. A predicted ink use value may be calculated by processor based on the predicted ink drop count, predicted ink drop weights, the image representation (e.g., a histogram) and the printing specifications. Actual ink use during a printing operation may be measured.

13 Claims, 2 Drawing Sheets

SYSTEM AND METHOD FOR PRE-PRINT INK USE ESTIMATION

BACKGROUND

Many printing devices apply ink to a print medium. The cost of a printing job is related to the amount of ink used during printing and other factors. Predicting the amount of ink used for a print job prior to printing may allow user to accurately estimate the cost of a print job, to determine whether the printer has sufficient ink to complete a printing operation, and to achieve other benefits. Typical printers may calculate a predicted amount of ink for a print job based on average ink used in previous print operations. Predicted ink calculations based on average ink used in previous print operations may, however, be insufficiently accurate for high volume print operations and more complex printing operations. As such, many print service providers build large margins into their estimated printing cost in order to ensure adequate profit on a print job.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
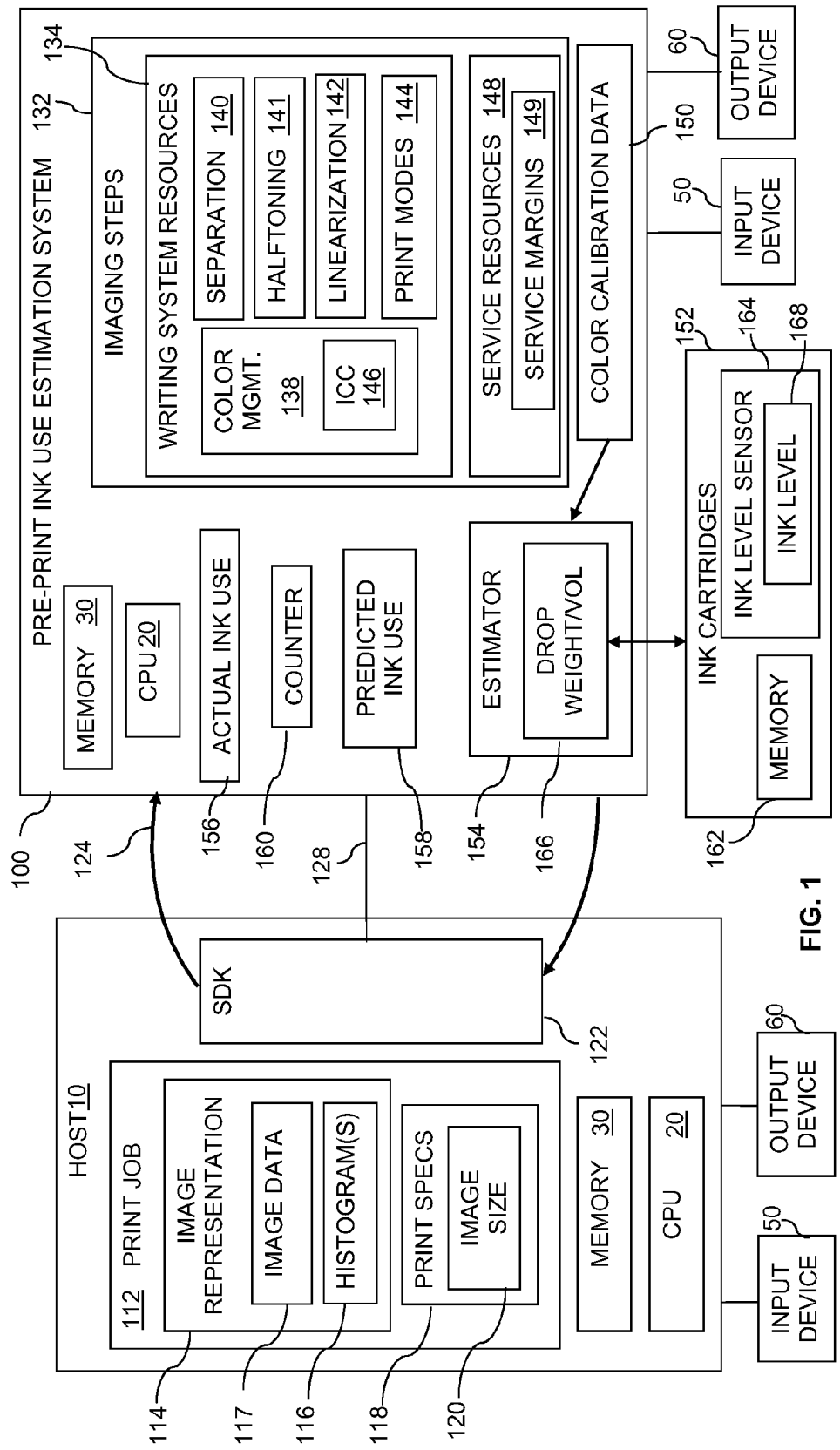
FIG. 1 is a schematic illustration of a pre-print ink use system according to examples of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "processing," "computing," "storing," "determining," "evaluating," "calculating," "measuring," "providing," "transferring," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

A method and system of pre-print ink use estimation may calculate an estimated ink use value for a print job prior to printing and may output the estimated ink use value to a user. One example of the present invention includes transferring a representation of an image (e.g., a histogram, data representing an image, a low resolution version of image data, a scaled version of an image, unaltered image data, or other information representing an image) and printing specifications (e.g., data relating to the print job including for example image size, print mode, media type, number of copies, or other data) to a printer; calculating a predicted ink drop or ink use count using the representation of the image in conjunction with a printer imaging step (e.g., one or more printer imaging steps), and calculating a predicted ink use value based on the predicted ink drop count, the representation of the image, and the printing specifications.

A representation of an image or image representation may, for example, be a histogram, a low resolution version of image data, a scaled down version of an image, a scaled up version of an image, image data (e.g., unaltered, uncompressed, and/or raw image data), or other information or data representing an image.

An image representation may, for example, be a histogram representing data describing frequencies of colors in an image, color bin sizes of an image, an image, and/or other information. An image representation may, for example, be a single multi-dimensional histogram representing frequencies of colors of an image. A multi-dimensional histogram may, for example, be a full color histogram and may represent multiple dimensions of color frequencies (e.g., three dimensions in a Red Green Blue (RGB) color space, four dimensions in cyan magenta yellow key (CMYK) color space, or other size dimensions) and/or colors in an image. A histogram may, for example, represent data in a table, a graphical representation of data, or other representation of data. A color frequency histogram may, for example, be a representation of the frequencies of colors in an image. A color frequency multidimensional histogram may, for example, represent the number of pixels (or another measure, such as area) in an image that have colors in each of a list or set of colors or color bins (e.g., ranges of color frequencies or intensities) in the image's color space (e.g., red green blue (RGB), cyan magenta yellow key (CMYK), or other color space). A color bin may, for example, represent or include a range of frequencies.

A software or a processor operating software within a computer (e.g., a software development kit (SDK)) or device may transfer or send a representation of an image (e.g., a histogram, raw image data, image data at a reduced resolution, a multidimensional histogram, or other data representing the color frequencies an image) and printing specifications representing a print job (e.g., an image or document) to a pre-print ink use estimation system. The system may, for example, be associated with or be a component of a firmware device or module in a printing device (e.g., a printer, printing device) or other device (e.g., a raster image processor (RIP), driver). The system may include a general purpose processor executing instructions. The system may calculate a predicted ink drop count value by processing the image representation through a printer image step, which may include one or more printer imaging steps. The printer imaging steps may be similar to the steps used to convert image data into printer halftone or contone data during typical printing operations. The imaging steps (e.g., imaging pipeline processes) may include color management, color separation, color linearization, halftoning and/or other steps. The imaging steps may be used to determine a predicted ink drop density values (e.g., a synthetic halftone or estimated halftone). The system (e.g., a device in a printer) may calculate a predicted ink use value by multiplying the predicted ink drop density values by an image representation (e.g., frequencies of a histogram, image scaling factor(s)), printing specifications (e.g., image size, number of copies, etc.), and/or other printing parameters. In other examples, ink drop density values need not be used. The predicted ink use value may be output to the software or a processor operating software (e.g., the SDK), computer, user, and/or other system. Predicted ink use values output to a printer operator may be used to accurately estimate the cost of a print job (e.g., image, brochure or document) prior to printing. Predicted ink use values (e.g., ink use for a print job or image) output to a computer may, for example, be compared to actual ink used after the completion of printing of the print job or image. By comparing predicted ink use values to actual ink used the printer may, for example, progressively or iteratively improve the pre-print ink estimation process. Comparing predicted ink use values to actual ink used may, for example, increase accuracy in determining the amount of ink used in servicing processes and/or other processes not related to actual image printing.

Examples of the invention may be particularly useful in printing devices used for high volume, and/or large scale printing. A prediction of the amount of ink and media (e.g., paper) needed for a print job may be quickly generated and displayed to a user. An accurate prediction of whether a printer includes sufficient ink to complete a print job may also be quickly determined and displayed to a user. The prediction may be calculated and used by a user prior to actual printing steps being taken allowing users to conserve print resources (e.g., paper, ink, and other printer resources).

FIG. 1 is a schematic illustration of a pre-print ink use system according to examples of the present invention. Pre-print ink use estimation system 100, host device 10 (e.g., a computing device or other device), and/or other devices may each include one or more processor(s) or controller(s) 20 and/or memory 30. Memories 30 may variously include, for example, print file histogram information, print sizes, print device modes, media types, color management data, color separation data, histogram tables, print file conversion data, ink use prediction data, and other information or data.

Each processor or controller 20 may be, for example, a central processing unit (CPU), a chip, or any suitable computing or computational device. Processor or controller 20 may include multiple processors, and may include general-purpose processors and/or dedicated processors. Processor 20 may execute code or instructions, for example, stored in memory 30 or long-term storage 40, to carry out examples of the present invention.

Each memory 30 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 30 may be or may include multiple memory units.

Memory 30 may be or may include, for example, long term storage. Long term storage may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units.

System 100 may, for example, include input device(s) or area(s) 50 and output device(s) or area(s) 60. Input device(s) or area(s) 50 may be, for example, a touchscreen, a keyboard, a microphone, pointer device, or other device. Output device(s) or area(s) 60 may be, for example, a display, screen, audio device such as speaker or headphones, or other device. Input device(s) or area(s) 50 and output device(s) or area(s) 60 may be combined into, for example, a touch screen display and input which may be part of system 100.

All components, devices, and/or modules in system 100 (e.g., memory 30, processors 20, input devices 50, output devices 60 etc.) may be implemented in firmware. Firmware may, for example, be associated with, included in, or a component of a printing device, printer, or other device.

Host device, host computing device, raster image processor (RIP), or other device 10 may, for example, be associated with a printing device or may be independent of a printing device. Host device 10 may generate a file or may receive a file from a computing device, a remote server, the Internet, a portable non-transitory storage device (e.g., a universal serial bus (USB) drive, flash drive, or other device), or a device or module associated with host device 10. The file may, for example, be an image file (e.g., portable document format (pdf), joint photographic experts group (JPEG) file, graphics interchange format (GIF), tagged image file format (TIFF), RAW, bitmap (BMP) image file, etc.), document (e.g., word processor document), or other file type.

Host device 10 may convert the file into a print job or print job information 112. Print job 112 may, for example, include, an image representation 114 (e.g., histogram(s) 116, image data 117 (e.g., an image file, document, etc.), a scaled version of an image, data representing an image, a low resolution version of image data, and/or other representation of an image), printing specifications 118, and other printing parameters or requirements which may describe how an image is to be printed. While various functions are shown, in one example, divided across certain units, the functions in other examples may be combined in one unit, or divided among other units.

An image representation 114 (e.g., representation of an image) may, for example, be or may include a histogram 116 (e.g., a multi-dimensional histogram, a color frequency histogram, a histogram representing image bin size(s), or other type of histogram), image data 117 (e.g., unaltered, uncompressed, and/or raw image data), a scaled version of an image, a low resolution version of image data 117, a compressed version of image data 117, or other information or data representing an image.

Histogram(s) 116 (e.g., a multi-dimensional color frequency histogram) may represent an image, features of an image, or image data 117 to be printed. Histograms 116 may, for example, represent aggregate amounts of frequencies of colors, colors, color bins or other information. Histograms 116 may, for example, not include a spatial distribution of or spatial correlation between colors or color frequencies in an image. A multidimensional color frequency histogram 116 may, for example, be a representation of the frequencies of colors in an image. Color frequency histogram 116 may represent the number of pixels or aggregate area, that have colors in each of a fixed list of color bins or ranges in the image's color space (e.g., red green blue (RGB), cyan magenta yellow key (CMYK), or other color space). A color bin may, for example, be a range of intensities within a given color and may represent a color or a shade of a color. The size (e.g., file size, amount of data, etc.) of histogram 116 may, for example, depend on the number of bins, the number of color space dimensions (e.g., RGB, CMYK, etc.), and/or other factors and parameters. The number of bins, number of color space dimensions, and other factors may be similar among multiple histograms 116 representing different images; therefore, the size of multiple histograms 116 representing different images may be equivalent or roughly equivalent. The size of the actual image, which histogram 116 represents, may, for example, depend on the width, height, resolution, bit depth, color space dimension, and/or other factors or parameters, which may vary from image to image. As such, the file size of different images may vary. Histogram 116 file sizes may, therefore, be larger than, smaller than, or equivalent to the actual or original image file size.

Image data 117 compression processes may typically result in image quality degradation. Histogram(s) 116 may, for example, be compressed (e.g., using data compression methods) with minimal loss of quality (e.g., image quality). A compressed histogram 116 representing an image may, therefore, be used to increase the speed and/or efficiency of the ink use prediction system or method 100 with minimal reduction image quality.

Image representation 114 may, for example, be a scaled version of an image. A scaled version of an image may, for example, be generated from an image using scaling factor(s) or other parameters. A scaled version of an image may, for example, be a lower or higher resolution version of an image, a smaller or larger version of an image, or an otherwise modified version of an image.

Printing specifications 118 may, for example, include printed image size 120 (e.g., letter, legal, A4, etc.), printing image quality (PIQ) requirements, number of print copies, print mode, media type (e.g., a sheet of paper, synthetic paper, photographic paper, wax paper, metal, metal fabric, glass, polymeric sheets, flexible PVC, self-adhesive vinyl, mesh or other type of image medium), size of media (e.g., paper dimensions, number of paper cuts required, etc.), image resolution, pixel resolution (e.g., dots per inch (dpi)), spatial resolution (e.g., pixels per inch (ppi)), print specifications (e.g., color printing, grayscale specifications, etc.), print speed, and other information or requirements.

A software development kit (SDK) 122 associated with host device 10 may, for example, request an ink-use prediction 124 by, for example, transferring print job information 112 (e.g., image representation 114, printing specifications 118, and/or other data) to a pre-print ink use estimation system 100. Pre-print ink use estimation system 100 may, for example, be a component of or be associated with firmware (e.g., machine readable instructions in a device) in a device (e.g., a printing device). System 100 may, for example, be or be a component of a printer, printing device firmware, print device, print device controller, a print device driver, or other device. System 100 may, in one example, be a component of a printer, which may include ink deposition components, paper handling components, and/or other components. System 100 may, for example, be a component of a printer firmware or other device, which may apply or perform color pipeline processes (e.g., color management, separations, linearization(s), halftoning, etc.), and other functions. System 100 may, for example, be a component of or be associated with host computing device 10, but typically system 100 may be component of firmware in a printer or other device.

Host device 10 may, for example, include a raster image processor (RIP) or other device which may request ink-use prediction from system 100. System 100 may, for example, be connected to host device 10 using a printing device connection 128. Printing device connection 128 may, for example, be a wire connection (e.g., a data bus, universal serial bus (USB), category 5 cable connection, parallel port connector, or other hard connection), wireless connection, local area network (LAN) connection, or other type of connection.

A request for ink-use prediction 124 may, for example, be transferred to system 100 from host device 10 using printing device connection 128. Print job information 112 (e.g., image representation 114, printing specifications 118, and/or other data) and request for ink-use prediction 124 may, for example, be transferred to system 100 using printing device connection 128 (e.g., a wire, USB, LAN, wireless connection, etc.).

A request for ink-use prediction 124 may, for example, be a web-service query, in which case the functionality of system 100 and processor 20 within system 100 may be in a printer remote from host device 10, in a remote computer or server, or in another device. A web-service query may, for example, be performed using transmission control protocol and internet protocol (TCP/IP) data transmitted over an Ethernet connection with printing device (e.g., over an intranet or other network). Other data transmission methods and systems may be used.

Print job information 112 including, for example, an image representation 114 (e.g., color frequency histogram 116 or other representation of an image) and printing specifications 118 describing how an image is to be printed may be accepted or received at pre-print ink use estimation system or other device 100. In other examples, image representation 114 (e.g., histogram information 116, etc.), printing specifications 118, or other information may be sent along with different information, or organized differently.

Image representation 114, printing specifications 118 (e.g., image size and other specifications), and other print job information may, for example, be processed using a printer imaging step 132 (e.g., one or more printer imaging steps or image pipeline steps) to calculate a predicted or estimated ink drop count. Printer imaging steps 132 may, for example, include writing system resource based steps 134, service resource based steps 136, and other steps. Printer imaging steps 132 may be normally used to process input data to create instructions for a printer to produce a printed document, but in examples of the present invention printer imaging steps 132 may be used prior to printing to estimate ink usage.

Writing system resource 134 steps may be or may simulate, represent, or emulate the steps used in converting an image, document or other file (e.g., a printer command language (PCL), page description language (PDL), Postscript or other file) to printer control instructions. Writing system resource steps 134 may normally be used to process data to create instructions output to a printer to produce a printed document, but in examples of the present invention writing system resource steps 134 may be used prior to printing to estimate ink usage.

Writing system resource based steps 134 may, for example, include color management 138, color separation steps 140, linearization steps 142, print modes 144, halftoning 141, and/or other steps. The color management 138, color separation steps 140, linearization steps 142, print modes 144, halftoning 141, and/or other steps may be performed as a process and the output of one step may be input to another step. For example, the output of color management operation 138 may be input to color separation operation 140. The output of the color separation operation 140 may be input to a linearization operation 142. Color management steps 138, color separation steps 140, linearization steps 142, halftoning 141, and/or other steps may be governed or modified based on print modes 144, image quality requirements, and other factors or parameters. Writing system resource steps may be performed in other orders or may be performed independently of other steps. Imaging steps 132 (and other functions such as ink drop weight estimator 154, predicted ink use 158) may, for example, be performed by processor 20 within system 100 executing instructions stored in memory 30 within system

100, but may be performed by another processor, by dedicated hardware, or other systems.

Writing system resource based steps 134 may include color management 138 steps. Color management 138 may, for example, convert colors using International Color Consortium (ICC) profiles 146 or other profiles. ICC profiles 146 or other color profiles may, for example, be used to convert, map or translate color frequency histogram 116 color data represented in a color space values (e.g., red-green-blue (RGB) values) to printer color space values (e.g., printer RGB values). The printer color space values (e.g., RGB or other color space) may correspond to image representation 114 (e.g., histogram 116) color space values such that a color in image representation 114 (e.g., histogram) appears the same as a printed color. For example, color management steps 138 may translate image representation 114 (e.g., color frequency histogram 116 representing the image file, a scaled version of an image, image data 117, or other representation of an image) from a color space used by host device 10 (e.g., an RGB color space or other color space) to a color space used by a printer (e.g., an RGB color space or other color space).

Writing system resource based steps 134 may, for example, include color separation steps 140. Color separation steps 140 may be used to determine color space value(s) to create a predetermined color (e.g., determined during color management 138). Color separation 140 may determine that a pixel location in an image may use, for example, cyan, magenta, yellow, black, light cyan, light magenta, and/or other color space values (e.g., corresponding to inks) to generate a color. Color separation 140 may, for example, determine that to create a light blue pixel a certain combination of cyan and magenta color should be used. The color separation steps 140 may, for example, generate color space values based on print modes 144 and/or with reference to a conversion table, look-up tables, or other transformation approach.

Writing system resource based steps 134 may, for example, include linearization or calibration steps 142. Linearization steps 142 may be used to ensure color consistency in a printed image and/or ensure consistency in multiple copies or versions of an image printed at different times. Linearization steps 142 may, for example, include calibration and/or linearization steps. Calibration steps may, for example, apply a set of transfer curves (e.g., one for each physical ink channel) to compensate for deviations from a nominal printer component (e.g., printheads, and other components) or print device response, thus enabling print-to-print and printer-to-printer consistency. Linearization steps 142 may, for example, apply a set of transfer curves (e.g., one for each physical ink channel) to modify printer or printer component response to match a desired target response. Linearization steps 142 may, for example, include combined linearization and calibration, and a single set of transfer curves may be applied to physical ink channel values.

Linearization steps 142 may, for example, adjust printer ink channel values based on media type (e.g., what paper is being used), print mode (e.g., image quality), variations in printer environment (e.g., humidity, temperature, and other environmental parameters), type of print-head used, and other factors. Linearization steps 142 may, for example, be used to compensate for or correct variations in ink drop weight and ink drop volume resulting from printer environment (e.g., humidity, temperature, and other environmental factors). Linearization 142 may, for example, redistribute color frequency histogram 116 values or ink amounts along color gradation curves (e.g., CMYK gradation curves) by adjusting ink drop weights or volumes to ensure smooth color transitions. For example, linearization 142 may adjust a color bin ink drop weight or volume to ensure that a printhead or ink channel smoothly and/or linearly applies ink to the page (e.g., from lightest shade to darkest shade of a color (e.g., blue or another color)).

Writing system resource based steps 134 may, for example, include halftoning steps 141. The output of color management 138, color separation 140, linearization 142, and/or other system resource steps (e.g., CMYK data) may, for example, be converted into a synthetic halftone data representation of the image during a halftoning 141 or other operation. The synthetic halftone may be a representation or approximation of a halftone used to print the image. The synthetic halftone may, for example, model or represent a typical halftone (e.g., actual halftone statistics). In contrast to a typical halftone, which may generate drops or a drop count for each pixel, a synthetic halftone may, for example, model or represent the ratio of drops per pixel (e.g., ink drop densities) on a hypothetical large region of that pixel's color.

The synthetic halftone may be or may represent estimated or predicted ink drop densities (e.g., for each ink) used in printing the image. Calculation of the synthetic halftone (e.g., estimated or predicted ink drop densities (e.g., predicted ink drops per pixel) may be performed using a look-up table, statistical approach, or other mathematical approach. For example, a synthetic halftone may model or represent ink-drop combinations or proportions used to produce certain colors (e.g. for light blue based on halftoning tables, on average 2 drops of cyan and 1 drop of magenta may be used or 1 drop of cyan and 2 drops of magenta may be used with respective proportions). The combinations may, for example, be used to determine the density of ink drops for each color based on the combinations provided in halftone tables.

A predicted ink use value, amount, or count 158 may be calculated (e.g., by processor 20 associated with system 100) based on the synthetic halftone (e.g., estimated or predicted ink drop densities), image representation 114 (e.g., color frequency histogram 116, scaled version of an image, image data 117 or other representation of image data) and/or printing specifications 118. Image representation 114 may, in one example, be a color frequency histogram 116 and the ink drop densities (e.g., from synthetic halftone) may, for example, be multiplied by frequencies in color frequency histogram 116 for each color or color bin (e.g., ranges of color intensities or frequencies in cyan, magenta, yellow, black, or other colors) to determine a number of ink drops (e.g., for each color in image). Image representation 114 may, in one example, be a scaled image and the ink drop densities may, for example, be multiplied by image scaling factor(s) or other parameters to determine an ink drop count. Ink drop densities may, for example, be multiplied by other parameters or data to determine ink drop counts (e.g., for each color in image).

According to some examples, the product of the ink drop densities (e.g., from the synthetic halftone) and image representation 114 (e.g., histogram frequencies, scaling factor(s), etc.) may be multiplied by a predicted ink drop weight to calculate or determine the amounts of ink to used to create each color in image.

The product of the ink drop density, image representation 114, and predicted ink drop weight 166, which may represent the amount of ink used to create each color in the image, may be multiplied by printing specifications 118 (e.g., overall image size 120, number of pages, number of copies, etc.) to determine the total ink used for each color in the image. Multiplying by printing specifications 118 may, for example, account for the image size 120 and image quality (e.g., dpi or ppi) of the final printed image. The total ink used for each of the colors in the image may be combined to determine an estimated or predicted ink use value 158. Estimated or predicted ink use value 158 may be calculated based on predicted or assumed ink drop weights for each ink drop. Other ink use estimation methods may be used.

Predicted ink use value 158 may, for example, be altered (e.g., increased or decreased) by printer servicing ink use margins 149 (e.g., an ink use servicing margin or servicing margin) to take into account servicing processes 148. Servicing margins 149 may, for example, be based on the size of the print operation, scheduling of the print operation (e.g., schedule of when documents will be printed), servicing strategy (e.g., print all copies of document at once, print some copies at one to other copies at another time), printing device maintenance, or other parameters. Servicing margins 149 may, for example, take into account servicing processes 148, which may be used in a printer to maintain the printer, printer components (e.g., ink cartridges), print media (e.g., paper or other media), and/or other devices. During a servicing process 148 ink may be applied to maintain, ensure, or test the function of the printer. The ink applied during a servicing process 148 may, for example, not be applied to the print media, may not be used to print an image, or may be wasted. For example, printers (e.g., inkjet printers) may include ink cartridges with multiple nozzles and/or pens to apply ink to print media. The pens may, for example, need to warm up prior to applying ink to a print media, and the pens may be warmed up by applying ink (e.g., by wasting ink). Similarly, ink may be applied outside the boundaries of a print media during a printing process to maintain the function of the nozzles during printing. The size of the printed image on a print media (e.g., paper) may, for example, affect the amount of ink used in servicing (e.g., applied outside the printed area, wasted, etc.) and effect servicing margins 149. Ink may, for example, be wasted to check the function or availability of the nozzles during and prior to printing. Ink may also be applied after applying ink to a print media to clean the ink nozzles.

Predicted ink use value 158 may, for example, be larger to print a multiple page print job than a single page print job. Servicing margin 159 may, for example, be determined based on the number of documents in the print queue or number of documents to be printed, printing settings, and internal servicing processes associated with a printing device. The predicted ink use value taking into account ink use servicing margin(s) 149 may be stored (e.g., stored in memory 30) and compared to actual ink used 156 during a print operation. The service margin(s) 149 may, for example, be built into, incorporated into, or used to alter predicted ink use value 158. Predicted ink use value 158 may, for example, be output to SDK 122. SDK 122 may, for example, display predicted ink use value 158 to a user.

A printing operation may, for example, be performed to print the image represented in the print job information 112. An actual amount of ink used or actual ink use 156 (e.g. the actual amount of ink drops) during the printing operation may be measured. Actual ink use 156 may, for example, be measured by an ink measurement device in printer, by a module (e.g., software) in the printing device, or by comparing ink levels in ink cartridges 152 after printing to ink levels in the ink cartridges 152 prior to printing. Actual ink use 156 may, for example, be determined from the amount of ink applied by the print-head(s). For example, the number of ink drops applied by the print-head (e.g., for each type of ink), assumed drop weights (e.g., for each type of ink), and other parameters may be used to determine actual ink use 156. Actual ink use 156 may, for example, be determined using other sensors or methods.

Actual ink use 156 may, for example, be compared to predicted ink use value 158. Error margins may, for example, be calculated based on the comparison of the predicted ink use value 158 to actual ink use values 156. The error margins may be built into, incorporated into, or used to alter future predicted ink use 158 calculations. The correlation between predicted ink use value 158 and actual ink use values 156 may, for example, be used by an ink drop weight estimator 154 to estimate ink drop weights 166.

Ink drop weight estimator 154 may, for example, update a predicted, estimated or nominal ink drop weight or ink drop volume 166. Predicted ink drop weights or volumes 166 may be calculated using linearization of ink calibration data 150, previously estimated or predicted ink drop weights, and/or possibly actual ink drop weights or volumes. Color calibration or linearization data 150 may, for example, be the same or similar data to the data used during linearization or calibration step 142. Actual ink drop weight or volumes may be determined based on measured actual ink use values 158. Ink drop weight estimator 154 may, for example, adjust estimated ink drop weights and/or ink drop volumes 166 according to or in proportion to adjustments made to ink drop weights and/or ink drop volumes during linearization steps 142. Actual ink use 156 (e.g., actual ink drop count) during a printing operation may, for example, be compared to predicted ink drop counts 158 and predicted ink drop weights 166 may be updated based on the comparison.

Estimated ink drop weights and/or ink drop volumes 166 may, for example, be compared to previously predicted or estimated ink drop weights and/or ink drop volumes, and the difference between estimated and previously estimated ink drop weights may be used to correct or adjust predicted ink use values 158.

Predicted ink use values 158 may, for example, be used to predict whether a printer 100, ink cartridge or container 152, printing device, or other device has sufficient ink to complete a print job or operation. Print cartridge 152 may, for example, include an internal ink level sensor or estimation device 164, which estimates an ink-level and/or remaining ink amount 168 in a print cartridge 152. When a new ink cartridge or container 152 is installed or loaded in printer, a counter or other device 160 in system 100 may be reset or set to zero. Actual ink use values 156 for a printer cartridge may be stored in counter 160 as printer cartridge 152 is used to apply ink. After each print operation, linearization 142, servicing process 148, and/or other process, the printer cartridge ink level 164 in printer cartridge ink level sensor 164 may be correlated to actual ink use values 156 stored in counter 160. Printer cartridge ink levels 168 may, for example, be adjusted or updated based on the comparison of the ink level sensor values 164 and counter 160 values. Adjusted or updated printer cartridge ink levels 168 may, for example, be stored in memory, database, or non-transitory storage medium 162 associated with ink cartridge 152.

It may, for example, be determined based on printer cartridge ink-levels 168 and predicted ink use value 154 whether a print device (e.g., a printer or other device) has sufficient, adequate, or enough ink to complete print job 112. For example, if predicted ink use value 154 is greater than printer cartridge ink levels 168, it may be determined that printing device does not have sufficient ink to complete print job 112. A notice (e.g., "printer has insufficient ink for print job", or other notice) may be output to SDK 122 (e.g., with predicted ink use 158) and displayed to a user. For example, if predicted ink use value 154 is less than or equal to printer cartridge ink levels 168, predicted ink use 158 may be output to user without a warning or with other information.

Figure 2:
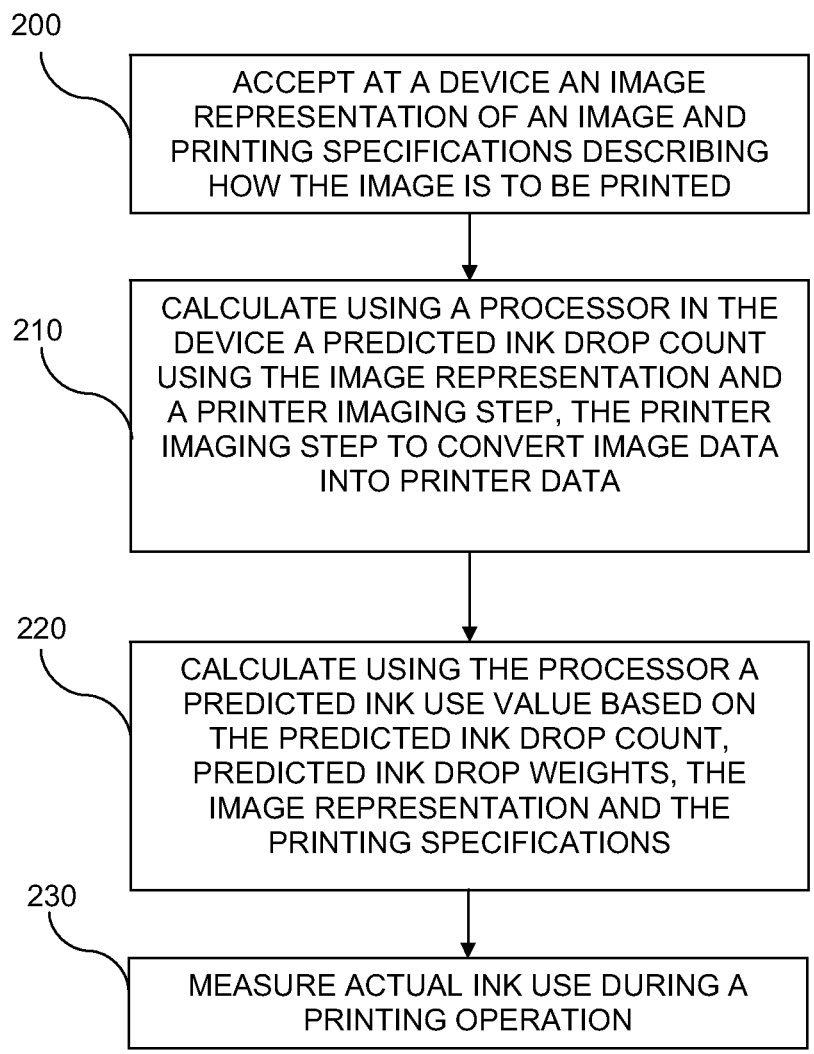
FIG. 2 is flowchart of a method according to examples of the present invention.

FIG. 2 is a flowchart of a method according to examples of the present invention. In operation 200, an image representation of an image (e.g., image representation 114 of FIG. 2) and printing specifications (e.g., printing specifications 118 of FIG. 2) describing how the image is to be printed may be received at a device (e.g., pre-print ink use estimation system 100 of FIG. 2).

In operation 210, a predicted ink drop count may be calculated by, for example, a processor (e.g., processor 20 in FIG. 1 or processor 20 in FIG. 2) in the device using the image representation and a printer imaging step (e.g., printer imaging steps 132 in FIG. 2). The printer imaging step(s) may be used to convert image data into printer data. The printer imaging step(s) may, for example, include color management (e.g., color management 138 in FIG. 2), color separation (e.g., color separation 140 in FIG. 2), halftoning (e.g., halftoning 141 of FIG. 2), linearization steps (e.g., linearization steps 142 in FIG. 2), and/or other steps.

In operation 220, a predicted ink use value (e.g., predicted ink use value 158 in FIG. 2) may be calculated by processor 20 based on the predicted ink drop count, predicted ink drop weights (e.g. predicted ink drop weight 166), the image representation, and the printing specifications.

In operation 230, actual ink use (e.g., actual ink use 156 of FIG. 2) may be measured during a printing operation. Actual ink use may be measured, for example, by an ink level sensor (e.g., ink level sensor 164 of FIG. 2), a counter (e.g., counter 160 of FIG. 2) or another device.

Other or different series of operations may be used.

Examples of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Examples of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different examples are disclosed herein. Features of certain examples may be combined with features of other examples; thus certain examples may be combinations of features of multiple examples. The foregoing description of the examples of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
accepting, at a device, an image representation of an image and printing specifications describing how the image is to be printed;
converting, using a processor in the device, image data of the image into printer data;
calculating, using the processor, a predicted ink drop count using the image representation and the printer data;
estimating, using the processor, predicted ink drop weights using linearization of calibration data and previously predicted ink drop weights;
calculating, using the processor, a predicted ink use value based on the predicted ink drop count, the predicted ink drop weights, the image representation, and the printing specifications;
measuring, using the processor, actual ink use during a printing operation;
calculating, using the processor, actual ink drop weights based on the measured actual ink use;
comparing, using the processor, the predicted ink use value to the measured actual ink use; and
calculating, using the processor, error margins based on the comparison of the predicted ink use value to the measured actual ink use.

2. The method of claim 1, comprising:
determining printer servicing ink use margins; and
altering the predicted ink use value based on the ink use margins.

3. The method of claim 1, wherein converting the image data further comprises converting the image data using color management, color separation, halftoning, and linearization.

4. The method of claim 1, comprising:
comparing a printer cartridge ink-level to the measured actual ink use;
determining an updated printer cartridge ink-level;
determining, based on the updated printer cartridge ink-level and the predicted ink use value, whether the device comprises sufficient ink to complete a print job; and
outputting a notice if the device comprises insufficient ink to complete the print job.

5. The method of claim 1, wherein the image representation comprises a color frequency histogram.

6. The method of claim 1, wherein the device comprises a printer.

7. A system comprising:
a memory; and
a processor to:
accept an image representation of an image and printing specifications describing how the image is to be printed;
convert image data of the image into printer data;
calculate a predicted ink drop count using the image representation and the printer data;
estimate predicted ink drop weights using linearization of calibration data and previously predicted ink drop weights;
calculate a predicted ink use value based on the predicted ink drop count, the predicted ink drop weights, the image representation, and the printing specifications;
measure actual ink use during a printing operation;

calculate actual ink drop weights based on the measured actual ink use;

compare the predicted ink use value to the measured actual ink use; and calculate error margins based on the comparison of the predicted ink use value to the measured actual ink use.

8. The system of claim 7, wherein the processor is to:

determine ink use margins based on printer servicing resources; and alter the predicted ink use value based on the ink use margins.

9. The system of claim 7, wherein the processor is further to convert the image data using color management, color separation, halftoning, and linearization.

10. The system of claim 7, wherein the processor is to:

compare a printer cartridge ink-level to the measured actual ink use;

determine an updated printer cartridge ink-level;

determine, based on the updated printer cartridge ink-level and the predicted ink use value, whether a printer comprises sufficient ink to complete a print job; and output a notice if the printer comprises insufficient ink to complete the print job.

11. The system of claim 7, wherein the processor is to:

compare the measured actual ink use to the predicted ink use value; and alter the predicted ink drop weights based on the comparison.

12. The system of claim 7, wherein the processor is to output the predicted ink use value.

13. A non-transitory computer readable program product comprising a computer readable storage medium storing machine-readable instructions that when executed by a processor cause the processor to:

accept an image representation of an image and printing specifications describing how the image is to be printed;

convert image data of the image into printer data;

calculate a predicted ink drop count using the image representation and the printer data;

estimate predicted ink drop weights using linearization of calibration data and previously predicted ink drop weights;

calculate a predicted ink use value based on the predicted ink drop count, the predicted ink drop weights, the image representation, and the printing specifications;

measure actual ink use during a printing operation;

calculate actual ink drop weights based on the measured actual ink use;

compare the predicted ink use value to the measured actual ink use; and calculate error margins based on the comparison of the predicted ink use value to the measured actual ink use.

* * * * *